(12) United States Patent
Chen et al.

(10) Patent No.: US 9,186,713 B2
(45) Date of Patent: Nov. 17, 2015

(54) HOT COILER DRUM WORKING AT 900-1200° C. AND METHOD FOR PRODUCING THE HOT COILER DRUM

(75) Inventors: Dianshuang Chen, Yantai (CN); Jinggang Sun, Yantai (CN)

(73) Assignee: YAN TAI DEVELOPMENT ZONE BLUE WHALE MAINTENANCE WELDING CO., LTD., Yantai, Shandong (CN)

( * ) Notice: Subject to any disclaimer, the term of this patent is extended or adjusted under 35 U.S.C. 154(b) by 956 days.

(21) Appl. No.: 13/383,212

(22) PCT Filed: May 26, 2010

(86) PCT No.: PCT/CN2010/073270
§ 371 (c)(1), (2), (4) Date: Jan. 10, 2012

(87) PCT Pub. No.: WO2011/015073
PCT Pub. Date: Feb. 10, 2011

(65) Prior Publication Data
US 2012/0119008 A1  May 17, 2012

(30) Foreign Application Priority Data

Aug. 4, 2009 (CN) .......................... 2009 1 0162123
Aug. 4, 2009 (CN) ....................... 2009 2 0167984 U

(51) Int. Cl.
| | | |
|---|---|---|
| B23K 28/00 | (2006.01) | |
| B21C 47/00 | (2006.01) | |
| B21C 47/28 | (2006.01) | |
| B23K 9/04 | (2006.01) | |
| B21B 1/34 | (2006.01) | |
| B21C 47/26 | (2006.01) | |
| B23K 26/34 | (2014.01) | |
| B23K 10/02 | (2006.01) | |
| B21C 47/06 | (2006.01) | |
| B23K 26/32 | (2014.01) | |
| B23K 35/02 | (2006.01) | |
| C21D 9/68 | (2006.01) | |
| F27B 17/00 | (2006.01) | |

(52) U.S. Cl.
CPC . B21C 47/28 (2013.01); B21B 1/34 (2013.01); B21C 47/063 (2013.01); B21C 47/26 (2013.01); B23K 9/048 (2013.01); B23K 10/027 (2013.01); B23K 26/3206 (2013.01); B23K 26/345 (2013.01); B23K 35/0238 (2013.01); C21D 9/68 (2013.01); F27B 17/00 (2013.01)

(58) Field of Classification Search
CPC ........ B21B 1/34; B21C 47/28; B21C 47/063; B21C 47/26; B23K 10/027; B23K 2201/04; B23K 2201/34; B23K 26/3206; B23K 26/345; B23K 35/0238; B23K 9/048
USPC .............. 72/148, 128, 11.5, 47; 228/126, 129
See application file for complete search history.

(56) References Cited

U.S. PATENT DOCUMENTS

| | | | |
|---|---|---|---|
| 3,122,337 A * | 2/1964 | Boron ......................... | 242/532.6 |
| 4,485,651 A * | 12/1984 | Tippins et al. ................. | 72/11.5 |
| 4,703,640 A * | 11/1987 | Buchegger et al. ............. | 72/128 |
| 4,761,983 A * | 8/1988 | Ginzburg et al. ............... | 72/148 |
| 2009/0139291 A1* | 6/2009 | Mikkola et al. .................. | 72/47 |

\* cited by examiner

*Primary Examiner* — Erin Saad

(57) ABSTRACT

A hot coiler drum working at 900-1200° C. includes: a drum body (3), two flanges (1), several radial rib plates (5) and several axial rib plates (6). The several radial rib plates (5) are fixedly arranged on an inner wall of the drum body (3) uniformly along the axial direction of the drum body (3), the several axial rib plates (6) are arranged on the inner wall of the drum body (3) uniformly except a window (4) zone of the drum body (3), and the axial rib plates (6) and the radial rib plates (5) are welded with the drum body (3) into a whole. A method for producing the drum is also provided. The manufacturing method replaces casting with welding, which eliminates the need for a large-sized casting device, thereby enhancing the finished product rate using simple processing.

7 Claims, 3 Drawing Sheets

HOT COILER DRUM WORKING AT 900-1200° C. AND METHOD FOR PRODUCING THE HOT COILER DRUM

FIELD OF THE INVENTION

This is a U.S. National Stage under 35 USC 371, the international application number is PCT/CN2010/073270 and the international filing date is 26 May 2010.

This invention relates to a hot coiler drum and method for producing the hot coiler drum, particularly to a hot coiler drum working at 900-1200° C. applied to a hot rolling mill and a method for producing the hot coiler drum.

BACKGROUND OF THE INVENTION

A conventional hot coiler drum applied in a steckel mill is usually processed by casting integrally. The conventional hot coiler drum usually only has a lifespan of 4 to 6 months because the conventional hot coiler drum rolls steel at 900-1200° C. It is also difficult to repair a defective conventional hot coiler drum since the conventional hot coiler drum is formed by integrally casting. Besides, the conventional hot coiler drum, formed by once integrally casting, has a diameter of 1.3 to 1.9 meters and a length of 3 to 5 meters, without a guarantee that all the used heat-resistant steel is processed by a solid solution, which affects the lifespan thereof. Moreover, there is no large-sized casting device in China and thus the conventional hot coiler drum mainly depends on import.

SUMMARY OF THE INVENTION

The purpose of the present invention is to solve the problems of a short lifespan and difficult repairing of a conventional hot coiler drum and provide a hot coiler drum working at 900-1200° C. and a method for producing the same.

In order to achieve the above purpose, the present invention adopts a following technical scheme.

A hot coiler drum working at 900-1200° C. according to the present invention, includes a drum body, two flanges, several radial rib plates, wherein a window is opened in an axial direction of the drum body, the two flanges are respectively fixed on two ends of the drum body, and the several radial rib plates are fixedly arranged on an inner wall of the drum body uniformly along the axial direction thereof, and further several axial rib plates, wherein the several axial rib plates are uniformly arranged on the inner wall of the drum body, except a zone of the window on the drum body, and welded with the radial rib plates and the drum body into a whole;

In the hot coiler drum working at 900-1200° C. according to the present invention, the said radial rib plates are welded on the inner wall of the drum body uniformly along the axial direction thereof;

In the hot coiler drum working at 900-1200° C. according to the present invention, guiding rib plates are welded on the said radial rib plates and the said axial rib plates arranged near the window;

In the hot coiler drum working at 900-1200° C. according to the present invention, the said two flanges are respectively welded on the two ends of the drum body;

In the hot coiler drum working at 900-1200° C. according to the present invention, the amount of the said radial rib plates is from 4 to 30;

In the hot coiler drum working at 900-1200° C. according to the present invention, the amount of the said axial rib plates is from 4 to 20;

In the hot coiler drum working at 900-1200° C. according to the present invention, the said two flanges have several flange rib plates welded uniformly along a radial direction thereof;

In the hot coiler drum working at 900-1200° C. according to the present invention, the amount of the said flange rib plates is from 4 to 8;

In the hot coiler drum working at 900-1200° C. according to the present invention, the said drum body, the said flanges, the said radial rib plats and the said axial rib plates are made of heat-resistant steel processed by a solid solution.

A method for producing a hot coiler drum working at 900-1200° C. according to the present invention, includes the following steps:

(i) welding a drum body into a cylinder having a desired diameter, and then fitting the welded drum body onto a supporting piece of a tooling piece that has a same diameter as that of an inner wall of the drum body;

(ii) reserving space for a window in an axial direction of the drum body, except a zone of the window on the drum body, uniformly welding several radial rib plates on the inner wall of the drum body along the axial direction of the drum body and welding several axial rib plates on the inner wall of the drum body along the radial direction of the drum body;

(iii) welding two flanges respectively on two ends of the drum body;

(iv) opening a window at the reserved space in the axial direction of the drum body, and welding guiding rib plates on the radial rib plates and the axial rib plates arranged near the window;

(v) eliminating the supporting piece on the tooling piece and withdrawing the tooling piece from the flange on either end of the drum body to finish producing the hot coiler drum.

In the method for producing a hot coiler drum working at 900-1200° C. according to the present invention, the said window is opened in segments along the axial direction of the drum body;

In the method for producing a hot coiler drum working at 900-1200° C. according to the present invention, the said welding method is in a groove welding method;

In the method for producing a hot coiler drum working at 900-1200° C. according to the present invention, the amount of the said radial rib plates is from 4 to 30;

In the method for producing a hot coiler drum working at 900-1200° C. according to the present invention, an amount of the said axial rib plates is from 4 to 20;

In the method for producing a hot coiler drum working at 900-1200° C. according to the present invention, the said drum body, the said flanges, the said radial rib plates and the said axial rib plates are made of heat-resistant steel processed by a solid solution.

Compared with the conventional hot coiler drum and the conventional method for producing the hot coiler drum, the hot coiler drum working at 900-1200° C. and the method for producing the hot coiler drum according to the present invention, have following advantages:

(1) The hot coiler drum produced by the method according to the present invention has a lifespan of more than one year, i.e., more than twice of that of the hot coiler drum;

(2) It is convenient to repair the hot coiler drum produced by the method according to the present invention. When becoming worn or cracked, the hot coiler drum can be repaired not only by the conventional way of welding, but also by replacing parts when necessary.

(3) The method according to the present invention replaces casting with welding, which no longer needs for a large-sized casting device, thereby resulting in less investment in producing devices and simpler processing devices;

(4) The method according to the present invention has a simple processing and high finished product rate;

(5) All parts of the hot coiler drum produced by the method according to the present invention are made of heat-resistant steel processed by a solid solution, further to guarantee the lifespan thereof.

DETAILED DESCRIPTION OF THE PREFERRED EMBODIMENT

Figures 1, 2:
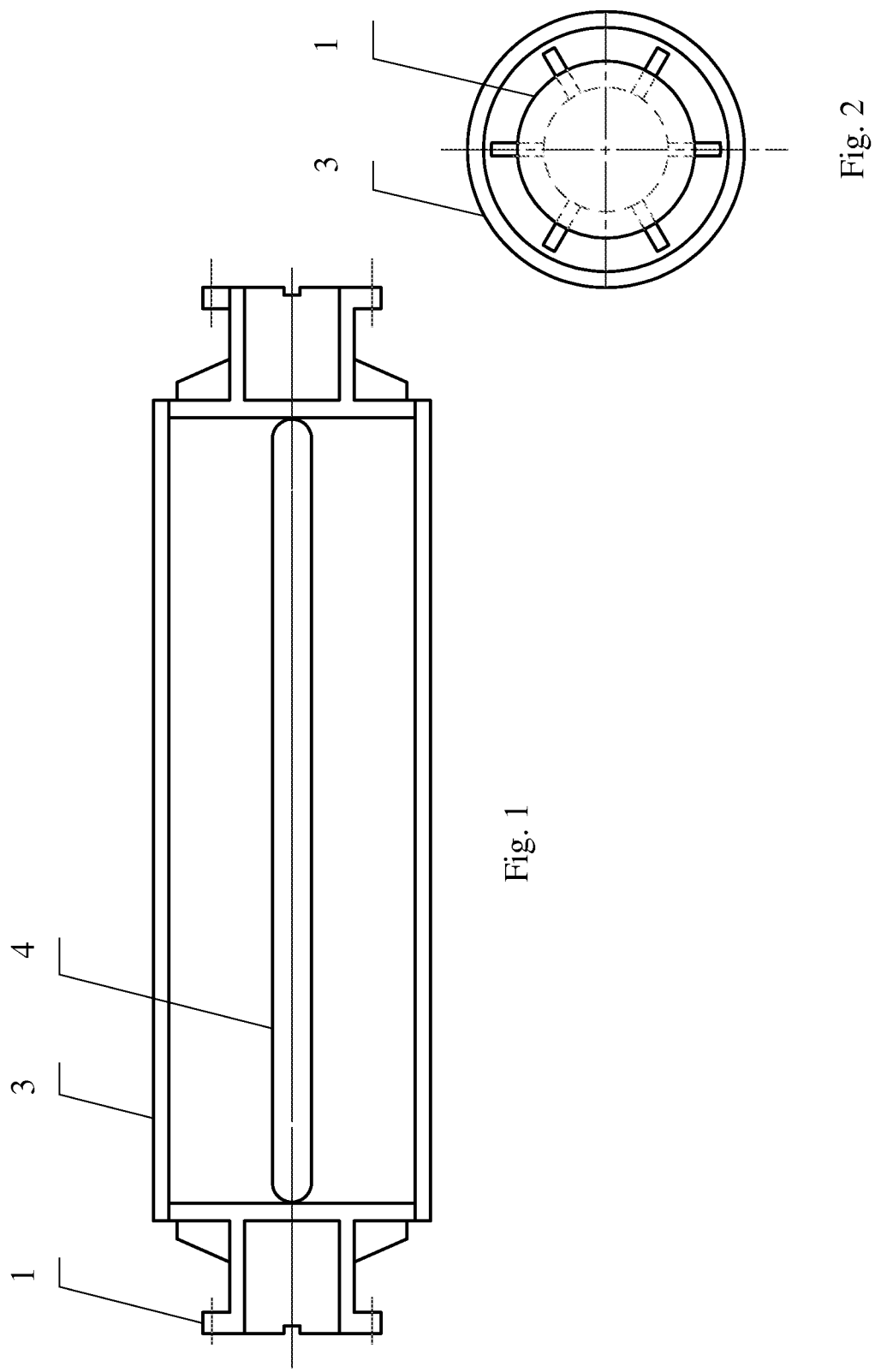
FIG. 1 is a front view of a hot coiler drum working at 900-1200° C. according to the present invention.
FIG. 2 is a right side view of FIG. 1.

Referring to the drawings from FIG. 1 to FIG. 4, the hot coiler drum having rib plates according to the present invention includes a drum body 3, two flanges 1, several radial rib plates 5 and several axial rib plates 6, wherein a window 4 is opened along an axial direction of the drum body 3, the two flanges 1 are respectively welded on two ends of the drum body 3, the several radial rib plates 5 are uniformly welded on an inner wall of the drum body 3 along the axial direction of the drum body 3, the axial rib plates 6 are uniformly arranged on the inner wall of the drum body 3 except a zone of the window 4 on the drum body 3, and the axial rib plates 6 are welded with the radial rib plates 5 and the drum body 3 into a whole. Guiding plates 7 are welded on the axial rib plates 5 and the radial rib plates 6 arranged near the window 4.

The number of the radial rib plates 5 depends on the length of the drum body 3, which is usually 4 to 30. The number of the axial rib plates 5 depends on the diameter of the drum body 3, which is usually 4 to 20.

Figures 3, 4:
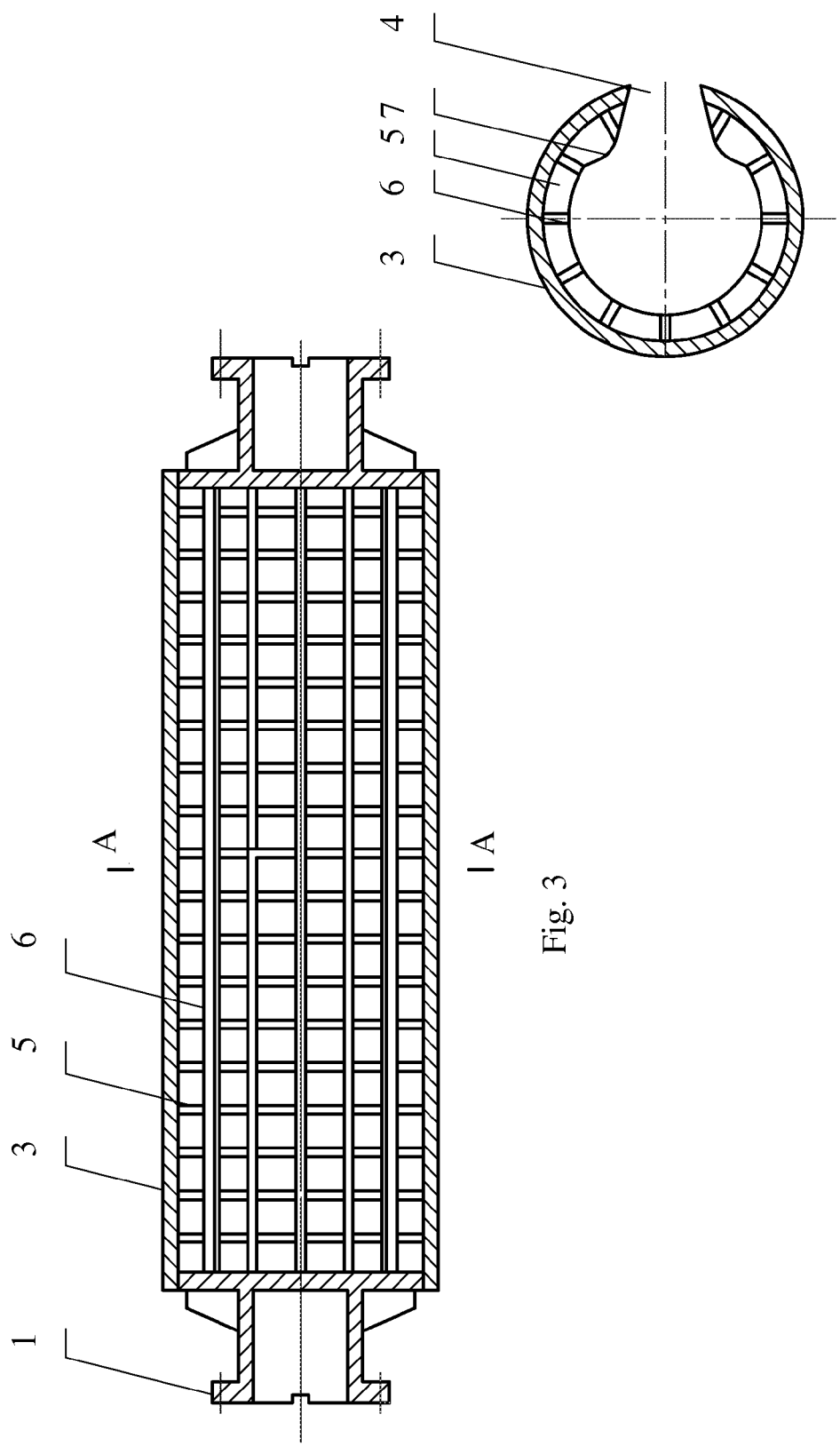
FIG. 3 is a front sectional view of FIG. 1.
FIG. 4 is a sectional view of the A-A part in FIG. 3.
Figure 5:
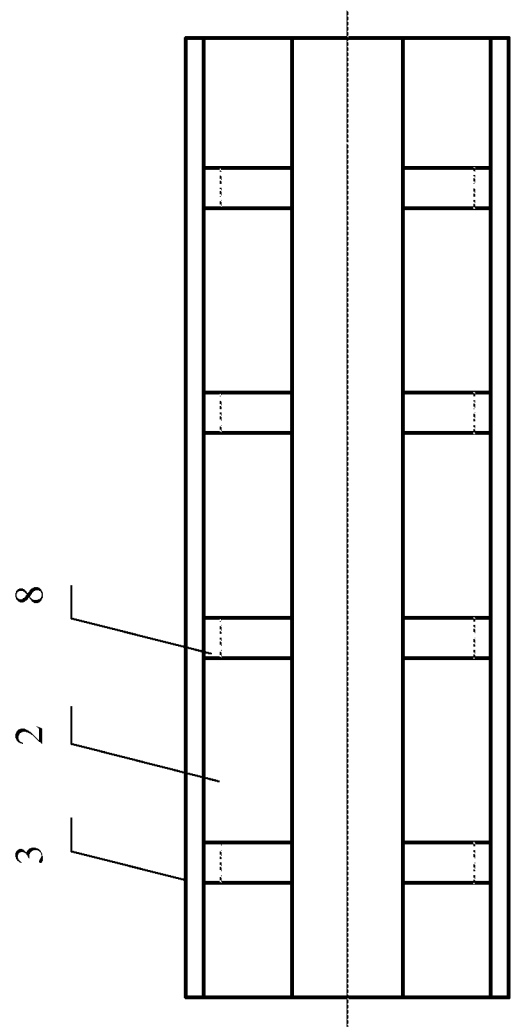
FIG. 5 is a sketch view of cooperation relationships between a tooling piece and a drum body in an assembling condition.

As shown in FIG. 1, FIG. 3 and FIG. 5, several flange rib plates 2 uniformly arranged along a radial direction thereof are welded on the two flanges 1. The number of the flange rib plates 2 depends on the diameter of the flange rib plates, which is usually 4 to 8.

The said drum body 3, the said flanges 1, the said radial rib plates 5 and the said axial rib plates 6 are made of heat-resistant steel processed by a solid solution.

Referring to FIGS. 1-5 of the drawings, a method for producing a hot coiler drum working at 900-1200° C. according to the present invention includes following steps:

(i) welding a drum body 3 into a cylinder having a desired diameter, and then fitting the welded drum body 3 onto a supporting piece 8 of a tooling piece 2 that has a same diameter as that of an inner wall of the drum body 3;

(ii) reserving space for a window 4 in an axial direction of the drum body 3, except a zone of the window 4 on the drum body 3, uniformly welding several radial rib plates 5 on the inner wall of the drum body 3 along the axial direction of the drum body 3 and welding several axial rib plates 6 on the inner wall of the drum body 3 along the radial direction of the drum body 3;

(iii) welding two flanges 1 respectively on two ends of the drum body 3;

(iv) opening a window 4 at the reserved space in the axial direction of the drum body 3, wherein the window 4 is opened in segments along the axial direction of the drum body 3 to prevent the drum body 3 from deformation, and welding guiding rib plates 7 on the radial rib plates 5 and the axial rib plates 6 arranged near the window 4;

(v) eliminating the supporting piece 8 on the tooling piece 2 and withdrawing the tooling piece 2 from the flange 1 on either end of the drum body to finish producing the hot coiler drum.

The number of the radial rib plates 5 depends on the length of the drum body 3, which is usually 4 to 30. The number of the axial rib plates 6 depends on the diameter of the drum body 3, which is usually 4 to 20.

The drum body 3, the flanges 1, the radial rib plates 5 and the axial rib plates 6 are made of heat-resistant steel processed by a solid solution.

FIG. 5 is a sketch view of cooperation relationships between the tooling piece and the drum body in an assembling condition.

Figure 6:
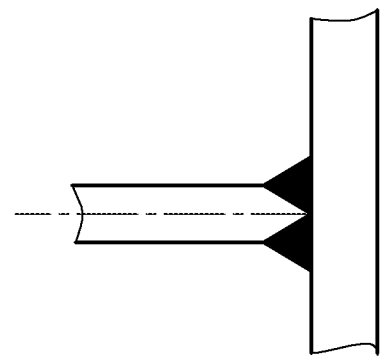
FIG. 6 is a sketch view of a partial enlargement of a welding method.

FIG. 6 shows that the welding method is in a groove welding method.

One skilled in the art will understand that the embodiment according to the present invention as shown in the drawings and described above is exemplary only and not intended to be limiting. This invention includes all modifications encompassed within the spirit and scope of the following claims. The embodiments have been shown and described for the purposes of illustrating the functional and structural principles according to the present invention and is subject to any change without departure from such principles.

INDUSTRIAL APPLICABILITY OF THE INVENTION

The method for producing a hot coiler drum working at 900-1200° C. according to the present invention is applied for a hot rolling mill.

What is claimed is:

1. A method for producing a hot coiler drum working at 900-1200° C. including following steps:
    (i) welding a drum body into a cylinder having a desired diameter, and then fitting the welded drum body onto a supporting piece of a tooling piece that has a same diameter as that of an inner wall of the drum body;
    (ii) reserving space for a window in an axial direction of the drum body, except a zone of the window on the drum body, uniformly welding several radial rib plates on the inner wall of the drum body along the axial direction of the drum body and welding several axial rib plates on the inner wall of the drum body along the radial direction of the drum body;
    (iii) welding two flanges respectively on two ends of the drum body;
    (iv) opening a window at the reserved space in the axial direction of the drum body, and welding guiding rib plates on the radial rib plates and the axial rib plates arranged near the window;
    (v) eliminating the supporting piece on the tooling piece and withdrawing the tooling piece from the flange on either end of the drum body to finish producing the hot coiler drum.

2. The method for producing a hot coiler drum working at 900-1200° C. according to claim 1, wherein the window is opened in segments along the axial direction of the drum body.

3. The method for producing a hot coiler drum working at 900-1200° C. according to claim 2, wherein the welding method is a groove welding method.

4. The method for producing a hot coiler drum working at 900-1200° C. according to claim 3, wherein there are 4 to 30 radial rib plates.

5. The method for producing a hot coiler drum working at 900-1200° C. according to claim 4, wherein there are 4 to 20 axial rib plates.

6. The method for producing a hot coiler drum working at 900-1200° C. according to claim 4, wherein the drum body, the flanges, the radial rib plates and the axial rib plates are made of heat-resistant steel processed by a solid solution.

7. The method for producing a hot coiler drum working at 900-1200° C. according to claim 5, wherein the drum body, the flanges, the radial rib plates and the axial rib plates are made of heat-resistant steel processed by a solid solution.

* * * * *